(12) United States Patent
Yanai et al.

(10) Patent No.: US 9,383,479 B2
(45) Date of Patent: Jul. 5, 2016

(54) OPTICAL FILM, PROCESS OF PRODUCING THE SAME, AND POLARIZING PLATE AND IMAGE DISPLAYING DEVICE EMPLOYING THE SAME

(71) Applicant: FUJIFILM Corporation, Minato-ku (JP)

(72) Inventors: Yujiro Yanai, Minami-ashigara (JP); Yasuyuki Sasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 514 days.

(21) Appl. No.: 13/869,362

(22) Filed: Apr. 24, 2013

(65) Prior Publication Data

US 2013/0234349 A1 Sep. 12, 2013

Related U.S. Application Data

(62) Division of application No. 12/413,853, filed on Mar. 30, 2009, now abandoned.

(30) Foreign Application Priority Data

Mar. 31, 2008 (JP) .................................. 2008-090903

(51) Int. Cl.
- *B29D 11/00* (2006.01)
- *G02B 1/04* (2006.01)
- *G02B 5/30* (2006.01)

(52) U.S. Cl.
CPC ................. *G02B 1/04* (2013.01); *G02B 5/3033* (2013.01); *Y10T 428/24942* (2015.01); *Y10T 428/31504* (2015.04); *Y10T 428/31971* (2015.04)

(58) Field of Classification Search
CPC ................................. G02B 1/04; G02B 5/3033
USPC ......... 264/1.1, 1.24, 1.31, 1.32, 134, 1.6, 1.7, 264/2.4, 235.6, 235.8, 288.4, 291
See application file for complete search history.

(56) References Cited

U.S. PATENT DOCUMENTS

| | | | |
|---|---|---|---|
| 6,177,153 B1 | 1/2001 | Uchiyama et al. | |
| 6,917,396 B2 | 7/2005 | Hiraishi et al. | |
| 2002/0089620 A1 | 7/2002 | Yamamoto et al. | |
| 2002/0160127 A1 | 10/2002 | Sakata et al. | |
| 2003/0156238 A1* | 8/2003 | Hiraishi ............... | G02B 5/0242 349/112 |
| 2007/0275188 A1 | 11/2007 | Sasada | |

FOREIGN PATENT DOCUMENTS

| | | |
|---|---|---|
| JP | 9-155981 A | 6/1997 |
| JP | 98-05984 T | 2/1998 |
| JP | 10-119125 A | 5/1998 |
| JP | 2000-075134 A | 3/2000 |
| JP | 2001-004813 A | 1/2001 |
| JP | 2001-172403 A | 6/2001 |
| JP | 2001-226501 A | 8/2001 |
| JP | 2002-098810 A | 4/2002 |
| JP | 2003-029030 A | 1/2003 |
| JP | 2008-296421 A | 12/2008 |
| KR | 10-2002-0008758 | 1/2002 |
| WO | WO2007/069465 A1 | 6/2007 |

OTHER PUBLICATIONS

Chinese Office Action issued by the State Intellectual Property Office (SIPO) of the People's Republic of China on Jul. 1, 2014, in corresponding Chinese Patent Application No. 200910132925.0 and an English Translation thereof. (9 pages).
Notification of the 4th Office Action issued on Dec. 25, 2013, by the Chinese Patent Office in corresponding Chinese Patent Application No. 200910132925.0, and an English Translation of the Office Action. (11 pages).
Chinese Office Action (Notification of the 3rd Office Action) dated Jun. 18, 2013, issued by the State Intellectual Property Office of P.R.C. in corresponding Chinese Patent Application No. 200910132925.0 and English translation. (6 pages).
Notice of Grounds for Rejection issued Oct. 24, 2014, by the Korean Patent Office in corresponding Korean Patent Application No. 2009-0027059 and English translation.
G.R. Strobl, "The Physics of Polymers" translated by Koji Fukao, Yoshihisa Miyamoto, Hideki Miyaji and Hisao Hayashi, Chapter 8, p. 346, line 6 to p. 347, line 4.
Official Action issued Feb. 14, 2012 in corresponding Chinese Patent Application No. 200910132925.0 and English translation thereof.
Official Action issued Jul. 3, 2012 in corresponding Japanese Patent Application No. 2009-071286, and English translation thereof.
English translation of $2^{nd}$ Official Action issued Dec. 3, 2012, in corresponding Chinese Patent Application No. 200910132925.0.
Japanese Machine Translation of JP2002-098810 A, Apr. 5, 2002.
Machine Translation JP 10-119125. May 12, 1998.
Legrand, Donald G. and John T. Bendier, Handbook of Polycarbonate Science and Technology, Marcel Dekker, Inc., New York, NY, p. 134, 2000.

\* cited by examiner

*Primary Examiner* — Stella Yi
(74) *Attorney, Agent, or Firm* — Buchanan Ingersoll & Rooney PC

(57) ABSTRACT

An optical film comprising a first domain of a polymer composition and a second domain disposed inside the first domain, wherein the second domain is a bubble having a morphology anisotropy, and the mean alignment direction of the main chain of the polymer molecule in the first domain differs from the mean direction of the major axis of the second domain, is capable of contributing toward display performance unification and body thickness reduction of an image display device.

3 Claims, No Drawings

OPTICAL FILM, PROCESS OF PRODUCING THE SAME, AND POLARIZING PLATE AND IMAGE DISPLAYING DEVICE EMPLOYING THE SAME

BACKGROUND OF THE INVENTION

1. Field of the Invention

The present invention relates to an optical film, a process of producing it, and a polarizing plate and an image display device employing it.

2. Description of the Related Art

Heretofore, a diffuser sheet is used in various image display devices. For example, in a liquid crystal display device (LCD), in general, a diffuser sheet is disposed between the backlight source and the backlight-side polarizing plate therein. Thus disposed in such a device, the diffuser sheet contributes toward unification of display characteristics, and acts to prevent formation of interference fringes such as moire to be caused by incident light that interferes with pixels in a liquid crystal cell. These days for the purpose of reducing the production costs, reducing the number of the members to constitute a liquid crystal display device is tried, and for energy-saving, reducing the number of the fluorescent lamps to be used as a light source is also tried. In addition, for further reducing the body thickness of LCD, the distance between the backlight source and the diffuser sheet in the device is reduced, and as a result, a conventional diffuser film could hardly attain uniform light diffusion.

For example, JP-A 2000-75134 proposes a light-diffusive polarizing plate having a light-diffusive layer, which has predetermined characteristics and which contains porous amorphous particles and spherical particles as dispersed therein, and this discloses the capability of omitting a light diffuser sheet. JP-A 2001-172403 proposes a method for producing a light diffuser film by casting a dope, containing particles, onto a support, and discloses the capability of producing a light diffuser sheet excellent in optical anisotropy according to this method. JP-A 2001-226501 proposes a method for producing a light diffuser film by stretching a polyester film containing a phase separation component, and discloses simple production of a light-diffusive resin film according to the method. JP-A 2001-4813 proposes a method for producing a light diffuser film by through stretching with formation of internal bubbles. JP-A 9-155981 discloses a film with internal bubbles formed therein, but has no description relating to the detailed structure of the bubbles in the film. On the other hand, JP-A 2003-29030 discloses a film having fine pores of specific morphology, in which, however, the production method for it is a special method. In JP-A 2003-29030, improving only the transmittance and the scatterability of the liquid crystal display device comprising an anisotropic scattering film produced therein is specifically noted, and nothing relating to a technique of unifying the display quality is not under investigation.

SUMMARY OF THE INVENTION

However, the light diffuser films described in the above-mentioned references have a low whole light transmittance, and therefore, using the film in an image display device may be a cause of reducing the front white brightness in the device. In addition, for securing sufficient light diffusibility, a large quantity of solvent-insoluble particles must be added to the diffusers, with which, therefore, the films may be more brittle, and the particles may aggregate in the dope with the lapse of time to thereby further worsen the quality of the films. Polyester films are difficult to directly stick to a polarizing element, and at least one interlayer film must be disposed between the polyester film and the polarizing element to be stuck together, thereby increasing the thickness of the polarizer. In addition, an additional step of forming bubbles may be necessary, thereby increasing the cost; and since the major axis direction of the bubble is nearly the same as the direction of the polymer main chain, the shape of the film may be restored owing to shrinkage when heated.

An object of the invention is to provide a novel optical film and a polarizing plate using it both of which are capable of contributing toward display performance unification and body thickness reduction of an image display device such as a liquid crystal display device, and to provide a process of producing the film in a simplified manner.

Another object of the invention is to provide an image display device of which the brightness is high and uniform all over the displaying plane in the white state and of which the body thickness may be reduced.

The means for achieving the above mentioned objects are as follows. Cellulose acylate polymer is especially preferred from the viewpoint of further reducing the thickness of flat panels, and the film of the type may be produced according to the method to be mentioned later.

[1] An optical film comprising a first domain of a polymer composition and a second domain disposed inside the first domain, wherein the second domain is a bubble having a morphology anisotropy, and the mean alignment direction of the main chain of the polymer molecule in the first domain differs from the mean direction of the major axis of the second domain.

[2] The optical film of [1], wherein the ratio of the major axis mean length of the second domain to the minor axis mean length in the film in-plane direction of the second domain is from 1.1 to 30.

[3] The optical film of [1] or [2], wherein the ratio of the major axis mean length of the second domain to the minor axis mean length in the film thickness direction of the second domain is from 30 to 300.

[4] The optical film of any one of [1] to [3], wherein the refractive index n1 of the first domain is larger by from 0.01 to 1.00 than the refractive index n2 of the second domain.

[5] The optical film of any one of [1] to [4], wherein the sphere-corresponding diameter of the second domain is at least 0.02 μm.

[6] The optical film of any one of [1] to [5], wherein the volume fraction of the second domain is from 20 to 70%.

[7] The optical film of any one of [1] to [6], wherein the second domain has a density distribution in the film thickness direction.

[8] The optical film of any one of [1] to [7], which has a haze of at least 15%.

[9] The optical film of any one of [1] to [8], wherein the polymer composition contains a cellulose acylate polymer as the main ingredient thereof.

[10] A method for producing an optical film of any one of [1] to [9], which comprises stretching a film comprising a polymer composition and having a haze of at most 1% at a stretching temperature of from (Tg-20)° C. to Tc° C. (Tg means the glass transition temperature (unit, ° C.) of the film, and Tc means the crystallization temperature (unit, ° C.) of the film) and at a draw ratio of from 1 to 300%.

[11] The method for producing an optical film of [10], wherein the stretching maximum stress to the film in the stretching direction during the stretching is controlled to be from 10 MPa to 60 MPa.

[12] The method for producing an optical film of [10] or [11], wherein the temperature difference between the surface temperature and the back temperature of the film during the stretching is controlled to be at least 0.1 degrees.

[13] A polarizer having at least one optical film of any one of [1] to [9].

[14] An image display device having at least one optical film of any one of [1] to [9] or at least one polarizer of [13].

According to the invention, there are provided a novel optical film capable of contributing toward display performance unification and body thickness reduction of an image display device such as a liquid crystal display device, and a polarizer comprising the film. The polarizer comprising the optical film of the invention exhibits light diffusibility and therefore contributes toward unification of display performance of an image display device such as a liquid crystal display device. In particular, when the optical film of the invention is used in an image display device, then a diffuser film heretofore indispensable in conventional display devices may be omitted with no trouble of in-plane unevenness and interference fringes such as moire; and therefore, the film contributes toward reducing the body thickness of the image display device comprising it. Specifically, according to the invention, there is provided an image display device, of which the front brightness (in the normal direction) at the time of white level of display is high and uniform, and of which the body thickness may be reduced.

Further, according to the production method of the invention, the optical film of the invention can be produced in a simplified manner.

BEST MODE OF CARRYING OUT THE INVENTION

The invention is described in detail hereinunder. In this description, the numerical range expressed by the wording "a number to another number" means the range that falls between the former number indicating the lowermost limit of the range and the latter number indicating the uppermost limit thereof. In this description, "polarizing film (polarizer)" is differentiated from "polarizing plate". "Polarizing plate" is meant to indicate a laminate that comprises a "polarizing film" and, as formed on at least one surface thereof, a transparent protective film to protect the polarizing film. And the error range acceptable in the technical field to which the invention belongs, for example, the technical field of polymer films, polarizing plates and image display devices may be also acceptable for the numerical ranges described in this description.

[Optical Film]

The invention provides an optical film comprising a first domain of a polymer composition and a second domain disposed inside the first domain, wherein the second domain is a bubble having a morphology anisotropy, and the mean alignment direction of the main chain of the polymer molecule in the first domain differs from the mean direction of the major axis of the second domain.

The mean direction of the main chain of the polymer molecule as referred to herein is meant to indicate the direction in which the polymer molecules are aligned in the film in-plane direction, and the thermal expansion coefficient and the humidity-dependent expansion coefficient in the direction are to be smaller than those in the direction perpendicular to that direction. Accordingly, in the optical film of the invention, the morphology change of the bubbles to be caused by the dimensional change owing to the external heat such as a backlight or the like, and also the morphology change of the bubbles to be caused by the dimensional change owing to the change of humidity environments may be prevented, and therefore when the optical film is incorporated into a liquid crystal display, it is effective for preventing the brightness unevenness of the display. The mean direction of the main chain of the polymer molecule may be determined, for example, according to X-ray diffractiometry mentioned below; and as simplified, the direction may be considered as the direction in which the in-plane modulus of elasticity of the film is the highest.

<X-ray Diffractiometry>

In the invention, the film may be analyzed through X-ray diffractiometry as follows: The film is conditioned at 25° C. and 60% RH for 24 hours, then using an automatic X-ray diffractiometer (RINT 2000, by Rigaku) and a general-purpose imaging plate reader (R-AXIS DS3C/3CL), the diffracted image of the beams having passed through the film is analyzed (CuKα ray, 50 kV, 200 mA, 10 minutes).

The second domain is a bubble disposed inside the first domain and having a morphology anisotropy. The mean direction of the major axis of the second domain differs from the mean alignment direction of the main chain of the polymer molecule in the first domain.

In general, the mean direction of the major axis of the second domain is nearly in parallel to the stretching direction, or that is, the direction of the polymer main chain, but in the invention, this is in a direction quite differing from the latter.

Not adhering to any theory, this may be considered because, since the film is stretched within a predetermined temperature range, the crystal moiety and the amorphous moiety formed in the polymer during the film formation process may be torn away. Specifically, when the film is stretched at a suitable temperature, then only the amorphous moiety is torn; and when the draw ratio in stretching is more than a predetermined level, the constitutive polymer is cracked to form voids, and therefore the major axis of the second domain may be aligned in the direction differing from the stretching direction.

In the invention, the second domain is disposed inside the first domain, but the configuration of the other bubbles is not specifically defined so far as it is not against the sprit of the invention; and for example, the bubbles existing near the film surface may have a pore-like morphology running through the film to be open to the surface. Not against the sprit of the invention, the second domain may partly contain any other ingredient than vapor, and for example, it may contain a polymer having a different composition than that of the polymer of the first domain, or may be filled with water, an organic solvent or the like. Preferably, the bubble of the second domain is filled with a vapor from the viewpoint of controlling the refractive index of the film to fall within a preferred range of the invention, more preferably filled with air. In case where the second domain contains a solid ingredient, this includes an embodiment where a minor amount of a substance evaporated during film formation or any other powder or the like sticks to the second domain as a solid.

The morphology anisotropy as referred to in the invention means that the outward configuration of the bubble is anisotropic. The anisotropic bubble of the type has a long direction as its outward configuration, like an oval or a rod, and the length in that direction is referred to as the major axis of the second domain in the invention. The outward configuration may be roughed in some degree.

In this description, the major axis of the second domain is not specifically defined in point of the mean direction thereof, but preferably, the mean direction of the major axis of the second domain is in the parallel direction to the film surface.

The major axis mean direction and the major axis mean length of the second domain may be determined by analyzed the cross section of the film cut in any desired direction, for example, with an electronic microscope. In case where the major axis of the second domain exists in the parallel direction to the film surface, the major axis mean direction and the major axis mean length of the second domain may be determined according to the method mentioned below; and the method is preferably employed in the invention. The mean direction of the main chain of the polymer molecule of the film, as determined in the manner as above, is taken as 0°, and the film is cut vertically to the film surface at intervals of 5° from the 0° direction to the 180° direction in the film surface. For example, in case where a rectangular film is analyzed, and when the 0° direction indicating the mean direction of the main chain of the polymer molecule is in the lengthwise direction of the film, then the 90° direction is the cross direction of the film and the 180° direction is again the machine direction of the film that is the same as the mean direction of the main chain of the polymer molecule. All the cross sections (37 cross sections of the film in the invention) are analyzed, for example, with an electronic microscope, 100 second domains are selected at random in every cross section, the major axes of all these 100 second domains are measured, and the data are averaged. Of those 37 cross sections of the film, one in which the mean length of the 100 second domains' major axes (the width of the second domain in the cross section) is the largest is selected, and the angle at which the film is cut to give the cross section is taken as the mean direction of the major axis of the second domain in this description. The mean length of the major axes of those 100 second domains at that angle is taken as the major axis mean length of the second domain in this description. Hereinunder in this description, the major axis mean length of the second domain may be referred to as "mean length (a) of the major axis of the second domain".

The minor axis mean length in the film in-plane direction of the second domain may be determined as follows: Of the angles at which the film is cut to give the above-mentioned 37 cross sections, the angle at which the major axis mean direction is determined is shifted by 90°, in the film cross section at that shifted angle, 100 second domains are selected at random, and the length parallel to the film in-plane direction of the axes of those 100 second domains in the cross section (this is the width of the second domain in the cross section) is measured, and the data are averaged. This is taken as the minor axis mean length in the film in-plane direction of the second domain. Hereinunder in this description, the minor axis mean length in the film in-plane direction of the second domain may be referred to as "minor axis mean length (b) in the film in-plane direction of the second domain".

On the other hand, the minor axis mean length in the film thickness direction of the second domain may be determined as follows: In the cross section of the film cut at the angle at which the mean direction of the major axis of the second domain is determined, 100 second domains are selected at random, and the length of the axes parallel to the film-thickness direction in the cross section of those 100 second domains (length in the lengthwise direction of the second domain in the cross section) is measured, and the data are averaged. This is taken as the major axis mean length in the film thickness direction of the second domain. Hereinunder in this description, the minor axis mean length in the film thickness direction of the second domain may be referred to as "minor axis mean length (c) in the film thickness direction of the second domain".

As the mean direction of the major axis of the second domain differs from the mean direction of the main chain of the polymer molecule in the first domain therein, the optical film of the invention may be protected from shape deformation by heat, etc.

Preferably, the ratio of the major axis mean length of the second domain to the minor axis mean length in the film in-plane direction of the second domain, or that is, (mean length (a) of the major axis of the second domain)/(minor axis mean length (b) in the film in-plane direction of the second domain) is from 1.1 to 30, from the viewpoint of more effectively dispersing the pressure to the shape deformation of the film by heat, etc. More preferably, the ratio of the major axis mean length of the second domain to the minor axis mean length in the film in-plane direction of the second domain is from 2 to 20, even more preferably from 3 to 10.

Preferably, the ratio of the major axis mean length of the second domain to the minor axis mean length in the film thickness direction of the second domain, or that is, (mean length (a) of the major axis of the second domain)/(minor axis mean length (c) in the film thickness direction of the second domain) is from 30 to 300, from the viewpoint of the possibility that the film may have a high haze and an increased whole light transmittance as the curved surface of the second domain is made gentle relative to the light-traveling direction thereto. The ratio of the major axis mean length of the second domain to the minor axis mean length in the film thickness direction of the second domain is more preferably from 50 to 250, even more preferably from 100 to 200.

Preferably, the refractive index $n1$ of the first domain is larger by from 0.01 to 1.00 than the refractive index $n2$ of the second domain, more preferably by from 0.2 to 0.8, even more preferably by from 0.4 to 0.6. When the refractivity difference is larger, then the oblique outgoing light may be refracted in the front direction; but on the other hand, when the refractivity difference ($n1-n2$) is at most 1.00, then it is favorable in that the oblique outgoing light may not be refracted too much and the front brightness may fall within a preferred range. When the refractivity difference falls within the above-mentioned range, then it is favorable in point of both the diffusibility and the front brightness sustainability.

The refractive index of each domain may be measured, using an ellipsometer (M220, by JASCO).

The size of the second domain is preferably equal to or more than 0.02 μm, more preferably equal to or more than 0.1 μm, even more preferably equal to or more than 1 μm. The size of each second domain of a bubble is preferably larger, as enhancing the light diffusibility, which, however, may lower the whole light transmittance. From the viewpoint of the whole light transmittance, the size of the second domain is preferably equal to or less than 10 μm, more preferably equal to or less than 5 μm.

The domain size means a sphere-corresponding diameter. The domain size is taken as the sphere-corresponding diameter thereof, and the radius, r, of the domain is determined, and the volume thereof is thereby determined. The sphere-corresponding diameter is represented by the following formula (1) in which the volume of the second domain (bubble) having an anisotropic morphology is represented by V. The domain size may be measured with an electronic microscope.

$$\text{Sphere-Corresponding Diameter}=2\times(3\times V/(4\times\pi))^{(1/3)} \quad (1)$$

In this, the volume V of the second domain (bubble) is, on the presumption that the second domain is oval, computed as $V=4/3\times\pi\times(a/2)\times(b/2)\times(c/2)$ where a is the mean length of the major axis of the second domain, b is the minor axis mean length in the film in-plane direction of the second domain, and c is the minor axis mean length in the film thickness direction of the second domain.

Preferably, the volume fraction of the second domain in the film of the invention is from 20 to 70%, more preferably from 30 to 60%, even more preferably from 40 to 50%. When the volume fraction is higher, then the diffusibility of the film may increase more. On the other hand, when the volume fraction is at most 70%, then the whole light transmittance of the film hardly lowers and the front brightness could be in a preferred range, and in addition, the film strength may not lower too much. When the volume fraction of the second domain of a bubble falls within the above range, it is favorable in point of both the light diffusibility and the strength of the film.

The volume fraction means the ratio of the volume of the second domain to the total volume of the film, and this may be computed based on the size of each domain as measured in the manner mentioned above.

The volume fraction may be derived from the area of the second domain and the area of the cross section of the film in the electromicroscopic photograph of the cross section of the film. In the invention, the volume fraction is taken as the mean value of the data of the area fraction of the second domain in 100 sites in the cross section of the film cut in the thickness direction at an angle at which the mean direction of the major axis of the second domain is determined (that is, the cross section cut in the direction vertical to the film surface).

(Density Distribution in the Film-Thickness Direction)

Preferably in the film of the invention, the second domain has a density distribution in the film thickness direction. As the second domain has a density distribution in the film thickness direction, the distance from the former scattering to the next scattering may be shortened and the degree of scattering may be gradually changed, and therefore, the scattering orientation may be in the forward direction. As a result, the whole light transmittance of the film with the same haze may be increased than in uniform distribution scattering. In addition, as having a high-density site of the second domain in the film thickness direction, the film may be prevented from being brittle as a whole.

Taking the above into consideration, the film preferably has a part having a high density of the second domain in the film thickness direction of such that at least 70% of all bubbles are in a half of the overall film thickness. The high-density part of the second domain in the film thickness direction may be in the center of the film thickness, or in the surface of the film. In case where the high-density part of the second domain in the film thickness direction is in the surface of the film, it is desirable that the high-density part of the second domain in the film thickness direction is disposed on the side opposite to the side of the film to which a polarizing element is to stuck, for easier working of the film to construct polarizers. Preferably, the density distribution of the second domain is at least 70%, more preferably at least 75%, even more preferably at least 80%. The density distribution of the second domain may be determined according to the method mentioned below.

The density distribution means the volume ratio of the second domain in the part of a half of the film thickness when the half part of the film thickness in which the density of the second domain is the highest is selected. Like in the above, for example, this may be determined on the electromicroscopic photograph of the film cross section cut in the thickness direction at an angle at which the mean direction of the major axis of the second domain is determined (that is, the cross section cut in the direction vertical to the film surface).

Preferably, the haze of the optical film of the invention is at least 15%, more preferably at least 50%, even more preferably at least 70%. Having a higher haze, the optical film may have a higher light diffusibility, but on the other hand, its whole light transmittance may lower. Therefore, when the optical film of the type is used in an image display device, it may cause a reason of reducing the front white brightness. From this viewpoint, the haze of the optical film for use as the polarizer protective film is preferably from 50 to 95%, more preferably from 60 to 90%. The haze may be determined with a haze meter (NDH2000, by Nippon Denshoku Kogyo). Preferably, the whole light transmittance of the optical film of the invention is from 60 to 90%, more preferably from 65 to 85%, even more preferably from 70 to 80%. Also preferably, the parallel transmittance of the optical film of the invention is from 5 to 40%, more preferably from 7 to 35%, even more preferably from 10 to 30%. In this description, the whole light transmittance means the light transmittance of both linear light and diffused light; and the parallel transmittance means the light transmittance of linear light alone.

(First Domain)

The first domain is formed of a polymer composition. Not specifically defined, the polymer is preferably selected from those having a high visible-light transmittance. In consideration of the fact that the refractive index of the second domain of a bubble is 1.00 or so and the preferred volume fraction thereof is as above, the refractive index n1 of the first domain is preferably equal to or more than 1.1 in order that the refractivity difference between the first and second domains could be within the above-mentioned preferred range, more preferably equal to or more than 1.2, even more preferably equal to or more than 1.3. Examples of the polymers satisfying these requirements include cellulose acylate, polycarbonate, polyvinyl alcohol, polyimide, polyolefin, polyarylate, polyester, polystyrene, styrene copolymer, polymethyl methacrylate, methyl methacrylate copolymer, polyvinylidene chloride, etc. However, the invention is not limited to these. In consideration of the fact that, in general, the polarizing film to be stuck to the optical film is a polyvinyl alcohol film, preferred as the main ingredient polymer of the polymer composition for the first domain is a cellulose acylate or a polyvinyl alcohol that has an affinity for the polyvinyl alcohol film and has good adhesiveness; and from the viewpoint of the antiaging stability thereof, more preferred is a cellulose acylate. The "main ingredient polymer" as referred to herein means, when the film is formed of a single polymer, the polymer itself; but when the film is formed of plural polymers, it means the polymer having the highest mass fraction of all the constitutive polymers.

Cellulose acylate usable herein is further described below.

Cellulose, as the starting material for the cellulose acylate film, includes cotton linter, kenaf, wood pulp (broadleaf pulp, coniferous pulp), etc.; and any cellulose ester obtained from any type of starting cellulose may be used herein, and as the case may be, two or more different types of cellulose esters may be combined and used.

Cellulose acylate is an ester of cellulose with a carboxylic acid. In the cellulose acylate, all or a part of the hydrogen atoms of the 2-, 3- and 6-positioned hydroxyl groups of the glucose units that constitute cellulose are substituted with an acyl group. The acyl group preferably has from 2 to 22 carbon atoms, more preferably from 2 to 4 carbon atoms. Examples of the acyl group are, for example, an acetyl group, a propionyl group, a butyryl group, an isobutyryl group, a pivaloyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, a cyclohexanecarbonyl group, an oleoyl group, a benzoyl group, a naphthylcarbonyl group, and a cinnamoyl group. As the acyl group, preferred are an acetyl group, a propionyl group, a butyryl group, a dodecanoyl group, an octadecanoyl group, a pivaloyl group, an oleoyl group, a benzoyl group, a naphthylcarbonyl group, a cinnamoyl group, and most preferred are an acetyl group, a propionyl group, and a butyryl group.

The cellulose acylate may be an ester of cellulose with different types of carboxylic acids. That is, the cellulose acylate may be substituted with different types of acyl groups.

The degree of substitution of the hydroxyl group of cellulose in cellulose acylate with an acetyl group (having 2 carbon atoms) is represented by SA, and the degree of substitution of the hydroxyl group of cellulose therein with an acyl group having 3 or more carbon atoms is represented by SB. By controlling SA and SB, the haze of the cellulose acylate film to be produced according to the production process of the invention described hereinafter may be controlled.

Depending on the haze level necessary for the cellulose acylate film to be produced according to the production process of the invention for the film of the invention, (SA+SB) is suitably controlled. Preferably, $2.70<SA+SB\leq3.00$, more preferably $2.80\leq SA+SB\leq3.00$, even more preferably $2.85\leq SA+SB\leq2.98$. The film having a larger (SA+SB) tends to have a higher haze.

By controlling SB, the haze of the cellulose acylate film to be produced according to the production process of the invention may also be controlled. The film having a larger SB tends to have a higher haze, and at the same time, the elasticity and the melting point of the film may lower. In consideration of the balance between the haze and the other physical properties of the film, the SB range is preferably $0\leq SB\leq2.9$, more preferably $0.5\leq SB\leq2.5$, even more preferably $1\leq SB\leq2.0$. When all the hydroxyl groups of cellulose are substituted, the degree of substitution is 3.

Methods for producing cellulose acylate are described in detail in Hatsumei Kyokai Disclosure Bulletin No. 2001-1745 (published on Mar. 15, 2001 by Hatsumei Kyokai), pp. 7-12; and the description may be referred to herein.

The polymer composition that constitutes the first domain may contain additives along with one or more main ingredient polymers. Examples of the additives include a plasticizer (its preferred amount to be added is from 0.01 to 10% by mass of the polymer—the same shall apply to the numeral data hereunder), UV absorbent (from 0.001 to 1% by mass), a fluorine-containing surfactant (from 0.001 to 1% by mass), a release agent (from 0.0001 to 1% by mass), an antioxidant (from 0.0001 to 1% by mass), an optical anisotropy controller (from 0.01 to 10% by mass), an IR absorbent (from 0.001 to 1% by mass), etc.

Within a range not detracting from the effect of the invention, the polymer composition may also contain minor particles of an organic material, an inorganic material or their mixture as dispersed therein. These particles are added for the purpose of enhancing the film conveyance in film production. To attain the object not detracting from the effect of the invention, the particle size of the particles is preferably from 5 to 3000 nm, the refractivity difference between the particles and the polymer film of the invention is preferably from 0 to 0.5, and the amount of the particles to be added is preferably at least 1% by mass. For example, examples of the particles of an inorganic material include particles of silicon oxide, aluminium oxide, barium sulfate, etc. Examples of the particles of an organic material include acrylic resin, divinylbenzene resin, benzoguanamine resin, styrene resin, melamine resin, acryl-styrene resin, polycarbonate resin, polyethylene resin, polyvinyl chloride resin, etc.

[Method for Producing Optical Film]
(Stretching Step)

One embodiment of the optical film of the invention is a polymer film having bubbles dispersed therein. One example of the method for producing the optical film of this embodiment is mentioned below. The method does not require any complicated operation and specific apparatus, in which the optical film of the invention can be produced in a simplified manner. Specifically, the production method for the optical film of the invention comprises stretching a film comprising a polymer composition and having a haze of at most 1% at a stretching temperature of from (Tg-20)° C. to Tc° C. (Tg means the glass transition temperature of the film, and Tc means the crystallization temperature of the film) and at a draw ratio of from 1 to 300%.

First, a polymer film formed of a polymer composition is prepared. The polymer film may be a polymer film produced according to a solution casting method, or a polymer film produced according to a melt extrusion method. Depending on the property of the main starting polymer, a preferred production method may be selected. Solution casting method and melt extrusion method are described in detail in JP-A 2005-104148 and JP-A 2008-50562, and the descriptions may be referred to herein.

Next, the polymer film is stretched to thereby form plural bubble domains in the film. By controlling the stretching conditions such as the stretching temperature and the stretching ratio in the stretching step, plural bubble domains may be formed in the polymer film. Further, the shape and the size of the domain may also be controlled to fall within a preferred range, by controlling the stretching conditions. For stably producing the optical film of the invention, the stretching temperature is preferably from (Tg-20)° C. to Tc° C. (Tg is the glass transition temperature of the film, and Tc is the crystallization temperature of the film), more preferably from (Tg-10)° C. to (Tc-5)° C. Examples of the polymer include polyolefin (e.g. polyethylene, polypropylene, norbornene polymer), polycarbonate, polyarylate, polysulfone, polyvinyl alcohol, polymethacrylate, polyacrylate, and cellulose ester (e.g., cellulose triacetate, cellulose diacetate) Preferably, the film is stretched at draw ratio of from 1 to 300%, more preferably from 10 to 200%, even more preferably from 30 to 150%. In particular, for the cellulose acylate polymer, it is important to control the stretching temperature. In general, the haze value of the stretched film tends to increase with the increase in the draw ratio in stretching; however, when the stretching temperature is lower than the preferred range as above, then the film may be cut before it could have a sufficient haze, but when the stretching temperature is higher than the preferred range, then the stretched film could hot have a haze irrespective of the draw ratio. In case where the unstretched film is produced in a process of solution casting film formation, from the viewpoint of increasing a haze efficiently, the residual solvent amount in the web of the unstretched film, as computed on the basis of the formula mentioned below, is preferably from 0 to 5% by mass, more preferably from 0 to 3% by mass.

$$\text{Residual Solvent Amount (\% by mass)} = \{(M-N)/N\} \times 100$$

wherein M means the mass of the polymer film just before introduced into a stretching zone; N means the mass of the polymer film heated at 110° C. for 3 hours just before introduced into a stretching zone.

One preferred embodiment of the production method for the optical film of the invention includes controlling the temperature difference between the surface temperature and the back temperature of the film during the stretching to be at least 0.1 degrees. In other words, the method preferably includes stretching a film comprising a polymer composition and having a haze of at most 1% at a stretching temperature of from (Tg-20)° C. to Tc° C. (Tg means the glass transition temperature of the film, and Tc means the crystallization temperature of the film) and at a draw ratio of from 1 to 300%, in which the temperature difference between the surface temperature and the back temperature of the film is at least 0.1 degrees.

Even though the stretching temperature falls with the preferred temperature range, the film may be brittle when it is stretched to have a sufficiently increased haze. Further on the other hand, when the film is stretched at a temperature higher than the preferred range, its haze could not increase but the film is prevented from being brittle. Accordingly, when the film being stretched is made to have a temperature difference between the surface temperature and the back temperature of the film, then the density distribution in the film thickness direction of the second domain in the film may be controlled and the film thus stretched under the specific condition may satisfy both the requirements of haze increase and non-brittleness. Concretely, for example, in case where the high-density part of the second domain in the film thickness direction is desired to be formed on the side of the film surface, then the surface temperature of the film being stretched may be set lower by at least 0.1° C. than the back temperature of the film. In case where the high-density part of the second domain in the film thickness direction is desired to be formed on the back side of the film, then the back temperature of the film being stretched may be set lower by at least 0.1° C. than the surface temperature of the film.

Preferably, the temperature difference between the surface temperature and the back temperature of the film is controlled to be at least 0.1° C., more preferably from 0.5 to 30° C., even more preferably from 1 to 10° C. Also preferably, the temperature difference is given at a temperature higher than the stretching temperature. The temperature difference between the surface temperature and the back temperature of the film may be given, for example, by making the temperature of the hot air to be applied to the film for heating differ between the surface and the back of the film, or by making the amount of the hot air to be applied differ between the surface and the back of the film, or by contacting the film with a cooling roll or a heating roll.

In one example of the above-mentioned production method, a polymer film having a haze of at most 1% is stretched to form a domain of bubbles in the film, thereby producing an optical film having a haze of at least 15%. More preferably, the haze of the unstretched polymer film is from 0.1 to 1%, and the haze of the stretched polymer film is from 15 to 70%.

The production method of the invention does not require generation of bubbles before stretching, and therefore does not require any additional step in producing the intended bubbles-containing film. Accordingly, the production cost according to the method may be reduced.

The film may be stretched, using various stretchers, for example, a roll stretcher in which a film is stretched between heated hot rolls rotating at different peripheral speeds, a zone stretcher comprising at least a pair of units for holding a film in the film-traveling direction (for example, nip rolls, suction drums) and having a heating zone between the units, a tenter stretcher in which a film is clipped with tenter clips at its edges and is stretched in that condition. The film may be stretched in a mode of longitudinal or lateral monoaxial stretching treatment or in a mode of biaxial stretching treatment. In general, the film may be stretched in a mode of longitudinal monoaxial stretching treatment for stretching a long film in the machine direction thereof. In producing an ordinary birefringent film, a starting film may be stretched; however, in this, the stretching conditions differ from those in the production process of the invention, and therefore, the film produced has a low haze, and in this point, the stretching step in the process of producing such an ordinary birefringent film differs from that in the production process of the invention.

(Post-treatment for Haze Control)

The film stretched in the above-mentioned stretching step to have a haze may be further processed for post treatment for haze control. For example, heat or pressure may be imparted to the stretched film to thereby lower the haze of the film; and shear may be given to the repeatedly stretched film to thereby increase the haze of the film. A concrete method of reducing the haze comprises, for example, giving heat to the film at a temperature not lower than the stretching temperature with a heating device such as hot air or an IR heater, or giving pressure to the film with a pressure device such as nip rolls, or their combination. A concrete method of increasing the haze comprises, for example, repeating the above-mentioned stretching step, or giving shear to the film between nip rolls rotating at a different peripheral speed.

In the production method for the optical film of the invention, preferably, the stretching maximum stress in the stretching direction to the film being stretched is controlled to be from 10 to 60 MPa, more preferably from 25 to 45 MPa.

In the production method for the optical film of the invention, preferably, the stretching speed during the stretching is from 1 to 300%/min from the viewpoint of forming domains having a uniform size, more preferably from 3 to 100%/min, even more preferably from 5 to 50%/min.

Not specifically defined, the thickness of the optical film of the invention may be generally from 20 to 200 μm or so; and from the viewpoint of reducing the body thickness of display devices comprising the film, the thickness of the film is preferably from 20 to 100 μm or so.

[Polarizing Plate and Liquid Crystal Display Device]

The optical film of the invention is stuck to a polarizing film (polarizer), and used in various applications such as image display devices, etc. Before stuck to a polarizing film, the surface of the optical film may be surface-treated. The surface treatment may enhance the adhesiveness of the optical film to the polarizing film. Examples of the surface treatment include corona discharge treatment, glow discharge treatment, flame treatment, acid treatment, alkali treatment (saponification treatment), UV irradiation treatment, etc. In case where the main ingredient of the first domain of the optical film is cellulose acylate, the film is preferably processed for saponification treatment.

The polarizing film to be used in the invention is not specifically defined. Various types of polarizers may be used herein. Preferred are a coated polarizing film typically by Optiva Inc., or a polarizing film containing a binder, and iodine or a dichroic dye.

To the surface of the polarizing film opposite to the surface thereof to which the optical film of the invention is to be stuck, it is desirable that a protective film is stuck. Examples of the polymer material for the protective film may be the same as those of the polymer material for use in producing the optical film of the invention. Above all, preferred are cellulose acylate films, norbornene resin films, and polycarbonate films.

In case where the optical film of the invention is stuck to a polarizing film, an adhesive may be used. As the adhesive, for example, usable are a polyvinyl alcohol resin (including polyvinyl alcohol modified with an acetoacetyl group, a sulfonic acid group, a carboxyl group or an oxyalkylene group), and an aqueous solution of a boron compound. Of those, preferred is a polyvinyl alcohol resin. The thickness of the adhesive layer is preferably within a range of from 0.01 to 10 μm as a dry thickness thereof, more preferably within a range of from 0.05 to 5 μm.

The polarizer having the optical film of the invention is usable in various image display devices such as liquid crystal display devices, projection-type display devices, EL display devices, etc. When the polarizer having the optical film of the invention is used in image display devices, then a diffuser film, which is heretofore needed for enhancing the uniformity of the display performance such as brightness and for preventing interference fringes such as moire, may be omitted, and therefore, the polarizer contributes toward reducing the body thickness of the image display devices comprising it. In addition, not stuck to a polarizer, the optical film may be used alone. In such a case, the optical film may be disposed between constitutive components, and may be stuck thereto with an adhesive, or may be simply disposed between them with an air layer therebetween.

The polarizing plate having the optical film of the invention is favorably used as a polarizing plate to be disposed near the light source in an image display device; and more preferably, the polarizing plate is built in the device in such a manner that the optical film of the invention is the nearest to the light source in the device. For example, in case where the polarizing plate is used in a transmission-type liquid crystal display device, it is incorporated in the device on the side of backlight therein; and more preferably, the optical film of the invention is disposed not on the side of the liquid crystal cell but on the side of the backlight in the device.

The polarizing plate having the optical film of the invention may further have any other functional layers. In an embodiment where the polarizing plate is used in a liquid crystal display device, it may have an optically-compensatory layer for compensating birefringence of the liquid crystal cell in the device, and an antireflection layer, an antiglare layer, a hard coat layer, etc.

EXAMPLES

The invention is described more concretely with reference to the following Examples. In the following Examples, the material used, its amount and the ratio, the details of the treatment and the treatment process may be suitably modified or changed not overstepping the sprit and the scope of the invention. Accordingly, the invention should not be imitatively interpreted by the Examples mentioned below.
(Test Methods)
Various test methods for determining and evaluating the properties of the films produced herein are described below.
1. Glass Transition Temperature (Tg):
A DSC device (Rigaku's DSC8230) is used. A polymer film sample before heat treatment is put in an aluminium-made sample pan (Cat. No. 8578, by Rigaku) of DSC in an amount of from 5 to 6 mg. This is heated in a nitrogen current (50 mL/min) from 25° C. to up to 120° C. at a heating speed of 20° C./min, kept at the temperature for 15 minutes, and then cooled to 30° C. at −20° C./min. Next, this is again heated from 30° C. up to 250° C. at a heating speed of 20° C./min, and the thermogram of the sample during the process is analyzed. The temperature at the crossing point between the thermogram and the median line of two base lines is read as the glass transition temperature of the film.
2. Crystallization Temperature (Tc):
A DSC device (Rigaku's DSC8230) is used. A polymer film sample before heat treatment is put in an aluminium-made sample pan (Cat. No. 8578, by Rigaku) of DSC in an amount of from 5 to 6 mg. This is heated in a nitrogen current (50 mL/min) from 25° C. to up to 120° C. at a heating speed of 20° C./min, kept at the temperature for 15 minutes, and then cooled to 30° C. at −20° C./min. Next, this is again heated from 30° C. up to 320° C. at a heating speed of 20° C./min, whereupon the exothermic peak start temperature appearing during the process is read as the crystallization temperature of the film.
3. Degree of Substitution:
The degree of acyl substitution of cellulose acylate is determined through $^{13}$C-NMR according to the method described in Carbohydr. Res. 273 (1995) 83-91 (Tezuka et al.).
4. Haze, Whole Light Transmittance, and Parallel Transmittance:
A film is sampled at 5 points in the lateral direction thereof (a center point of the film, two edge-points thereof (at 5% of the whole width from each edge), and 2 intermediate-points between the center and each edge-point) at regular intervals of 100 m in the machine direction, thereby cut out samples having a size of 5 cm square. The sample is conditioned at 25° C. and at a relative humidity of 60% for 24 hours, and then, using a haze meter (NDH 2000, by Nippon Denshoku), the haze of each sample is measured, and the data are averaged to give the haze of the film.
For the whole light transmittance and the parallel transmittance, the film is sampled in the same manner, each sample is analyzed, and the data are averaged to give the whole light transmittance and the parallel transmittance of the film.
(Production Example: Production of Cellulose Acetate Propionate)
Cellulose (broadleaf pulp, 150 g) and acetic acid (75 g) were put into a reactor, 5-L separable flask equipped with a reflux unit, and vigorously stirred with heating in an oil bath controlled at 60° C. Thus pre-treated, the cellulose was swollen and pulverized to be fluffy. The reactor was cooled in an ice/water bath at 2° C. for 30 minutes.
Separately, a mixture of propionic anhydride (1545 g) and sulfuric acid (10.5 g) was prepared as an acylating agent, then cooled at −30° C., and added all at a time to the reactor containing the above pre-treated cellulose. After 30 minutes, the external temperature was gradually raised so that the inner temperature could reach 25° C. in 2 hours after the addition of the acylating agent. The reactor was cooled in an ice/water bath at 5° C. so that the inner temperature could be 10° C. in 0.5 hours after the addition of the acylating agent and could be 23° C. in 2 hours, and the inner temperature was kept at 23° C., and this was further stirred for 3 hours. The reactor was cooled in an ice/water bath at 5° C., then aqueous 25 mas. % acetic acid (120 g) cooled at 5° C. was added thereto, taking 1 hour. The inner temperature was raised up to 40° C., and this was stirred for 1.5 hours. Next, a solution prepared by dissolving magnesium acetate 4-hydrate in aqueous 50 mas. % acetic acid in an amount of 2 molar times that of sulfuric acid was added to the reactor, and stirred for 30 minutes. Aqueous 25 mas. % acetic acid (1 L), aqueous 33 mas. % acetic acid (500 mL), aqueous 50 mas. % acetic acid (1 L) and water (1 L) were added thereto in that order to thereby precipitate cellulose acetate propionate. Thus formed, the cellulose acetate propionate precipitate was washed with hot water. By changing the washing condition in the step, different cellulose acetate propionates can be obtained in which the amount of the residual sulfate radical varies. The sulfate radical content can be determined through ASTM D-817-96. After washed, the precipitate was stirred in an aqueous 0.005 mas. % calcium hydroxide solution at 20° C., then further washed with water until the pH of the wash could be 7, and thereafter dried in vacuum at 70° C.

Through $^1$H-NMR and GPC, the obtained cellulose acetate propionate was analyzed for the degree of acetyl substitution, the degree of propionyl substitution and the degree of polymerization thereof.

Cellulose acylate C used in the following Examples was produced according to the same method as above. Cellulose acylates A and B also used in the following Examples were produced with reference to the above-mentioned conventional methods.

(Production and Evaluation of Optical Film)

As in the Table given below, Cellulose acylate A or B was added to and dissolved in any of Solvent A or B in a ratio as indicated in the Table, and any of Additives A to C was selected and added thereto to thereby prepare a cellulose acylate dope. The details of the dope preparation is shown below.

The cellulose acylate was heated and dried at 120° C. so as to have a water content of 0.5% by mass, and this was used in the amount shown in Table 1 [part by mass].

1) Cellulose Acylate:

Cellulose Acylate A (Cellulose Acetate):

A powder of cellulose acetate having a degree of substitution of 2.94 was used as Cellulose acylate A. Cellulose acylate A had a viscosity-average degree of polymerization of 300, and a degree of 6-acetyl substitution of 0.94.

Cellulose acylate B (cellulose acetate):

A powder of cellulose acetate having a degree of substitution of 2.86 was used as Cellulose acylate B. Cellulose acylate B had a viscosity-average degree of polymerization of 300, a degree of 6-acetyl substitution of 0.89, an acetone extract of 7% by mass, a ratio of weight-average molecular weight/number-average molecular weight of 2.3, a water content of 0.2% by mass, a viscosity in 6 mas. % dichloromethane solution of 305 mPa·s, a residual acetic acid amount of at most 0.1% by mass, a Ca content of 65 ppm, an Mg content of 26 ppm, an iron content of 0.8 ppm, a sulfate ion content of 18 ppm, a yellow index of 1.9, and a free acetic acid amount of 47 ppm. The mean particle size of the powder was 1.5 mm, and the standard deviation thereof was 0.5 mm.

2) Solvent:

Solvent A having the following formulation was used. The water content of the solvent was at most 0.2% by mass.
Solvent A: Dichloromethane/methanol=87/13 (by mass)

3) Additives:

An additive selected from Additives A and B shown below was selected, and added in an amount of cellulose acylate shown in Table 1, in which the amount of the additive as parenthesized is "% by mass".

Additive A:
  Triphenyl phosphate (8.0% by mass),
  Biphenyldiphenyl phosphate (4.0% by mass).
Additive B:
  Condensate of ethanediol/adipic acid (1/1 by mol) (number-average molecular weight, 1000) (12.0% by mass)

4) Preparation of Cellulose Acylate Solution:

The above solvent and additive were put into a 400-1 stainless-made dissolver tank, which is so designed that it has a stirring blade therein and cooling water circulates around its outer periphery, and with stirring and dispersing them, cellulose acylate was gradually added thereto. After the addition, this was stirred at room temperature for 2 hours, then swollen for 3 hours, and thereafter again stirred to prepare a cellulose acylate solution.

For stirring, used were a dissolver-type eccentric stirring shaft moving at a peripheral speed of 15 m/sec (shear stress $5 \times 10^4$ kgf/m/sec$^2$ [$4.9 \times 10^5$ N/m/sec$^2$]), and a stirring shaft having an anchor blade at the center thereof and moving at a peripheral speed of 1 m/sec (shear stress $1 \times 10^4$ kgf/m/sec$^2$ [$9.8 \times 10^4$ N/m/sec$^2$]). For swelling, the high-speed stirring shaft was stopped, and the peripheral speed of the anchor blade-having stirring shaft was changed to 0.5 m/sec.

From the tank, the swollen solution was heated up to 50° C. in a jacketed duct, and further heated up to 90° C. under a pressure of 2 MPa to be completely dissolved. The heating time was 15 minutes. In this step, the filter, the housing and the duct were all made of corrosion-resistance Hastelloy, and equipped with a heat-insulating and warming jacket with a heating medium running through it.

Next, the temperature was lowered to 36° C., and a cellulose acylate solution was thus obtained.

5) Filtration:

The cellulose acylate solution was filtered through a paper filter having an absolute filtration accuracy of 10 µm (#63, by Toyo Filter Paper), and further through a sintered metal filter having an absolute filtration accuracy of 2.5 µm (FH025, by Poul) to prepare a polymer solution.

6) Production of Film:

The cellulose acylate solution was heated at 30° C., and cast on a mirror-face stainless support having a band length of 60 m set at 15° C., through a casting Giesser (JP-A 11-314233). The casting speed was 50 m/min, and the coating width was 200 cm. The space temperature of the whole casting area was set at 15° C. At 50 cm before the end of the casting area, the cellulose acylate film, thus cast while rotating, was peeled away from the band and dry air at 45° C. was applied thereto. Next, this was dried at 110° C. for 5 minutes and then at 140° C. for 10 minutes to give a cellulose acylate film. Haze of the obtained cellulose acylate film was measured by the above method and the result is shown in the Table 1 below.

7) Stretching:

Thus obtained, the cellulose acylate film was stretched according to the method mentioned below under the stretching condition shown in Table 1. The stretching ratio in stretching the film was determined as follows: In the direction perpendicular to the film traveling direction (the machine direction), the film was marked at regular intervals, and the distance between the marks was measured before and after the heat treatment step. The stretching ratio is represented by the following formula:

Stretching Ratio of Film (%) =100×[(distance between the reference marks after the stretching)–(distance between the reference marks before the stretching)/(distance between the reference marks before the stretching)].

In the following Examples, the reduction in the film width after stretching was from 10 to 25% or so.

The above stretching was machine-direction monoaxial stretching with a roll stretcher. The rolls of the roll stretcher were induction-heating jacket rolls each having a mirror-finished surface, and the temperature of the individual rolls could be controlled separately. The stretching zone was covered with a casing, and its temperature is as in Table 1. The roll before the stretching zone was so set that it could be gradually heated up to the stretching temperature shown in Table 1. The surface temperature and the back temperature of the film were so controlled as to have a temperature difference as in Table 1 by changing the temperature of the hot air to be given to the surface and the back of the film. The surface temperature and the back temperature of the film were determined as follows: A tape-type thermocouple surface temperature sensor (Anritsu-Meter's ST Series) was stuck to 3 points on both the surface and the back of the film, and the data were averaged. The temperature shown in Table 1 was computed by subtracting the surface temperature of the film from the back temperature thereof. The draw ratio in stretching was controlled by changing the peripheral speed of the nip rolls. The aspect ratio (distance between nip rolls/film inlet width) was controlled to be 0.5, and the stretching speed was 10%/min relative to the stretching distance. These are shown in Table 1.

(Production of Film for Comparative Example 3)

A cellulose acylate film was produced like the Film 3 in Example 1 in JP-A 2001-172403, and this is the film for Comparative Example 3. In Table 1, the data of the fine particles in the film, taken as the second domain, are given in the column of the second domain of the film in Comparative Example 3.

(Production of Film for Comparative Example 4)

Like in Example in JP-A 2001-4813, a film with bubbles formed therein was formed of a cellulose acylate, in which the direction of the main chain of the polymer was nearly in parallel to the mean direction of the major axes of the bubbles. A part from it, the film had nearly the same properties as in Example 1, and this is the film for Comparative Example 4.

8) Evaluation of Cellulose Acylate Film

The thus-obtained cellulose acylate films were analyzed for the haze, the whole light transmittance, the parallel transmittance and the refractive index of each domain. The results are shown in Table 1.

(Detailed Determination of the Structure of First Domain and Second Domain)

The films of Examples were analyzed for the molecule alignment direction of the polymer main chain, through X-ray diffractiometry according to the above-mentioned method.

Next, the film of each Example was cut in the direction vertically to the film surface in the film thickness direction, and the picture of the cross section thereof was taken with a scanning electromicroscope (S-4300, by Hitachi). According to the above-mentioned method, the mean direction of the major axis of the second domain was determined, and the mean length (a) of the major axis of the second domain was determined. Next, the minor axis mean length (b) in the film in-plane direction of the second domain and the minor axis mean length (c) in the film thickness direction of the second domain were determined also according to the above-mentioned method.

The major axis mean length of the second domain/the minor axis mean length in the film in-plane direction of the second domain, the major axis mean length of the second domain/the minor axis mean length in the film thickness direction of the second domain, and the sphere-corresponding diameter were computed according to the above-mentioned methods. In addition, the volume fraction, and the density distribution in the film thickness direction of bubbles were determined according to the above-mentioned methods. The obtained results are shown in Table 1 below. It was known that, in Examples, the molecule alignment direction of the polymer main chain was nearly in parallel to the stretching direction and was in the in-plane direction. It was also known that the mean direction of the major axis of the second domain was nearly perpendicular to the molecule alignment direction of the polymer main chain (in the direction at about 90° in the surface of the film), or that is, it is nearly perpendicular to the stretching direction.

The density distribution in the film thickness direction was the proportion of the second domain in the part of a half of the film thickness when the cross section of the film cut in the direction perpendicular to the film surface was photographed with a scanning electronic microscope and when the half part of the film thickness having the highest density was selected as the second domain. In Examples, the range of the half of the film thickness on the surface side of the film (that is, the upper half of the film, on which the stretching temperature was lower in point of the stretching temperature difference between the surface and the back of the film being stretched) was the part of the half of the film thickness in which the density of the second domain was the highest, and the density distribution in that part was determined.

(Evaluation by Heating)

The films produced in Example 1 and Comparative Example 4 were kept at 80° C. for 48 hours, and then the cross section of each film was photographed with a scanning electronic microscope. This was compared with the cross section of the corresponding film kept at room temperature.

As a result, the film of Example 1 did not change in point of the angle of the polymer main chain and the mean direction of the major axis of the second domain, the ratio of the mean length of the major axis to the minor axis in the in-plane direction of the second domain, the density distribution of bubbles, the size of the second domain and the haze of the film.

As opposed to this, the film of Comparative Example 4 greatly changed in point of the ratio of the mean length of the major axis to the mean length of the minor axis in the in-plane direction of the second domain, and the size thereof became small. In addition, the haze of the film reduced.

(Production of Polarizing Plate)

The surface of each of the films produced in the above was saponified with alkali. Concretely, each of the films was dipped in an aqueous 1.5N sodium hydroxide solution at 55° C. for 2 minutes, then washed in a rinsing bath at room temperature, and neutralized with 0.1N sulfuric acid at 30° C. Again, this was washed in a rinsing bath at room temperature and dried in hot air at 100° C. Next, a wind-up polyvinyl alcohol film having a thickness of 80 μm was unrolled and continuously stretched by 5 times in an aqueous iodine solution, then dried to give a polarizing film having a thickness of 20 μm. Using an aqueous 3% polyvinyl alcohol (Kuraray's PVA-117H) solution as an adhesive, each of the alkali-saponified films and a film, Fujitac TD80UL (by FUJIFILM), also saponified with alkali in the same manner were combined, and stuck together via a polarizing film sandwiched therebetween in a manner that the saponified surfaces of the two films were face the polarizing film, thereby fabricating a polarizing plate in which each of the produced films and Fujitac TD80UL could be the protective films for the polarizing film.

(Production and Evaluation of Liquid Crystal Display Device)

Using each of the polarizing plates fabricated in the above, a liquid crystal display device was produced. Concretely, a VA-mode liquid crystal cell was used as the liquid crystal cell, the polarizing plate on the backlight side was peeled away and each of the above-produced polarizing plates was stuck to the cell with an adhesive in a manner that the surface of the diffusive protective film was on the backlight side, thereby producing each of liquid crystal display devices.

Thus produced, each of the liquid crystal display devices was tested to confirm the display performance thereof. Concretely, the diffuser sheet was removed, and the device was checked for the brightness distribution change (brightness uniformity) and the front white brightness in the white state according to the method mentioned below. For measuring the brightness, used was BM-5 (by Topcon).

For confirming the brightness distribution change (brightness uniformity), BM-5 was scanned in the lateral direction of the panel (in the vertical direction to CCFL), and the brightness profile in the lateral direction (in the vertical direction to CCFL) was thus determined. The found data were individually divided by the background brightness to give a brightness fluctuation. The fluctuation corresponds to JND (just noticeable difference) relative to the brightness of human eyes; and when it is more than 10%, in general, ones could recognize brightness change, but when less than it, ones could not recognize it. Accordingly, the date of not more than 10% are taken as a standard for performance evaluation.

The front white brightness of a commercial VA-mode liquid crystal TV is from 350 to 600 [cd/cm$^2$]. Accordingly, in the invention, the data of at most 350 [cd/cm$^2$] are taken as a standard for performance evaluation.

The samples satisfying both the two evaluation standards of the brightness distribution change and the front white brightness to a high degree are good (A); those satisfying both the two but near to the critical value of the evaluation standards are average (B); and those not satisfying both the two are bad (C).

The results are shown in the following Table.

TABLE 1

| | Cellulose Acylate Solution | | | Unstretched Cellulose Acylate Film | | | Stretching | | | | |
|---|---|---|---|---|---|---|---|---|---|---|---|
| | Type of Cellulose Acylate | Type of Additive | Amount Added (mas. pt.) | Tg [(C.)] | Tc [(C.)] | Haze [%] | Temperature [(C.)] | Temperature Difference between Surface and Back of Film [(C.)] | Draw Ratio [%] | Stretching Temperature [%/min] | Stretching Maximum Stress [MPa] |
| Example 1 | A | no | — | 150 | 160 | 0.3 | 135 | 0.7 | 65 | 10 | 33 |
| Example 2 | A | no | — | 150 | 160 | 0.3 | 140 | 0.6 | 65 | 10 | 31 |
| Example 3 | A | no | — | 150 | 160 | 0.3 | 145 | 0.7 | 45 | 10 | 25 |
| Example 4 | A | no | — | 150 | 160 | 0.3 | 140 | 0.6 | 35 | 10 | 20 |
| Example 5 | A | no | — | 150 | 160 | 0.3 | 140 | 0.7 | 45 | 10 | 23 |
| Comparative Example 1 | A | no | — | 150 | 160 | 0.3 | 135 | 0.7 | 0 | 10 | — |
| Comparative Example 2 | A | no | — | 150 | 160 | 0.3 | 190 | 0.7 | 65 | 10 | 5.0 |
| Example 6 | A | A | 18 | 145 | 155 | 0.3 | 140 | 0.7 | 65 | 10 | 32 |
| Example 7 | A | A | 18 | 145 | 155 | 0.3 | 140 | 2 | 65 | 10 | 33 |
| Example 8 | A | A | 18 | 145 | 155 | 0.3 | 140 | 5 | 65 | 10 | 32 |
| Example 9 | A | B | 18 | 150 | 160 | 0.3 | 140 | 0.6 | 65 | 10 | 34 |
| Example 10 | B | no | — | 155 | 200 | 0.3 | 140 | 0.7 | 65 | 10 | 55 |
| Example 11 | B | A | 24 | 145 | 155 | 0.3 | 140 | 0.6 | 65 | 10 | 54 |
| Comparative Example 3 | — | — | — | 150 | 195 | — | — | — | — | — | — |
| Example 12 | A | no | — | 150 | 160 | 0.3 | 140 | 0.7 | 25 | 10 | 15 |
| Comparative Example 4 | A | no | — | 150 | 160 | 0.3 | 125 | 0.7 | 50 | 10 | 35 |

| | | | | Stretched Optical Film | | | |
|---|---|---|---|---|---|---|---|
| | | | | First Domain refractive index n1 | Second Domain | | |
| | Haze [%] | Whole Light Transmittance [%] | Parallel Transmittance [%] | | refractive index n2 | major axis mean length/minor axis mean length in in-plane direction | major axis mean length/minor axis mean length in film thickness direction |
| Example 1 | 75 | 70 | 18 | 1.46 | 1.00 | 6 | 120 |
| Example 2 | 75 | 70 | 18 | 1.46 | 1.00 | 5.5 | 110 |
| Example 3 | 60 | 75 | 30 | 1.46 | 1.00 | 5 | 100 |
| Example 4 | 35 | 85 | 55 | 1.46 | 1.00 | 2.5 | 50 |
| Example 5 | 50 | 80 | 40 | 1.46 | 1.00 | 4 | 80 |
| Comparative Example 1 | 0.3 | 93 | 93 | 1.46 | 1.00 | — | — |
| Comparative Example 2 | 0.2 | 93 | 93 | 1.46 | 1.00 | — | — |
| Example 6 | 79 | 70 | 15 | 1.48 | 1.00 | 5.5 | 100 |
| Example 7 | 73 | 71 | 19 | 1.48 | 1.00 | 5.5 | 100 |
| Example 8 | 70 | 71 | 21 | 1.48 | 1.00 | 5.5 | 100 |
| Example 9 | 68 | 72 | 23 | 1.46 | 1.00 | 5.5 | 100 |
| Example 10 | 75 | 70 | 18 | 1.46 | 1.00 | 5.5 | 100 |
| Example 11 | 68 | 72 | 23 | 1.46 | 1.00 | 5.5 | 100 |
| Comparative Example 3 | 90 | 40 | 4 | 1.48 | 1.60 | — | — |
| Example 12 | 20 | 90 | 72 | 1.46 | 1.00 | 1.5 | 30 |
| Comparative Example 4 | 10 | 95 | 86 | 1.46 | 1.00 | 1 | 10 |

TABLE 1-continued

| | Stretched Optical Film | | | | Density | Liquid Crystal Display Device | | |
|---|---|---|---|---|---|---|---|---|
| | Second Domain | | | | | | | |
| | | sphere-corresponding diameter [μm] | volume fraction [%] | Refractivity Difference n1 − n2 | Distribution of Bubbles in-Film Thickness Direction [%] | Brightness Distribution Change [%] | Front White Brightness [cd/m²] | Evaluation |
| | Example 1 | 1.66 | 45 | 0.46 | 85 | 1.50 | 375 | A |
| | Example 2 | 1.62 | 43 | 0.46 | 83 | 1.50 | 375 | A |
| | Example 3 | 1.56 | 35 | 0.46 | 85 | 2.50 | 400 | A |
| | Example 4 | 1.24 | 22 | 0.46 | 80 | 8.00 | 450 | B |
| | Example 5 | 1.46 | 30 | 0.46 | 85 | 3.00 | 430 | A |
| | Comparative Example 1 | — | — | 0.46 | — | 99.00 | 500 | C |
| | Comparative Example 2 | — | — | 0.46 | — | 99.00 | 500 | C |
| | Example 6 | 1.62 | 42 | 0.48 | 83 | 1.50 | 375 | A |
| | Example 7 | 1.62 | 42 | 0.48 | 89 | 1.60 | 380 | A |
| | Example 8 | 1.62 | 42 | 0.48 | 95 | 1.90 | 380 | A |
| | Example 9 | 1.62 | 40 | 0.46 | 85 | 2.00 | 390 | A |
| | Example 10 | 1.62 | 43 | 0.46 | 85 | 1.50 | 375 | A |
| | Example 11 | 1.62 | 40 | 0.46 | 85 | 2.00 | 390 | A |
| | Comparative Example 3 | — | — | −0.12 | — | 0.50 | 215 | C |
| | Example 12 | 1.05 | 20 | 0.46 | 85 | 9.00 | 450 | B |
| | Comparative Example 4 | 0.58 | 10 | 0.46 | 50 | 30.00 | 450 | C |

As in Table 1, Examples 1 to 3 and 5 to 11 where the optical film of the invention was used were all good (A) in point of the brightness uniformity. In Example 4, the draw ratio was small, and in this, the brightness distribution change (indicating the brightness uniformity) was nearly the uppermost limit, and the sample was average (B) as a total evaluation. In Example 12, the draw ratio was small, and in this, the brightness distribution change (indicating the brightness uniformity) was nearly the uppermost limit, and the sample was average (B) as a total evaluation. On the other hand, in Comparative Example 3 where the film was produced with particles dispersed therein, the front white brightness was low and the sample was had (C). In Comparative Examples 1 and 2 where the films did not have a bubble domain, the brightness was not uniform and the samples were bad (C). These confirm the excellent effect of the invention over conventional examples.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 090903/2008 filed on Mar. 31, 2008, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for producing an optical film comprising a first domain of a cellulose acylate polymer composition and a second domain disposed inside the first domain, wherein the second domain is a bubble having a morphology anisotropy, and the mean alignment direction of the main chain of the polymer molecule in the first domain differs from the mean direction of the major axis of the second domain, the method comprising:

stretching a film comprising a cellulose acylate polymer composition and having a haze of at most 1% at a stretching temperature of from (Tg−20)° C. to Tc° C. and at a draw ratio of from 30 to 150% wherein Tg means the glass transition temperature (unit, ° C.) of the film and Tc means the crystallization temperature (unit, ° C) of the film, wherein a stretching maximum stress to the film in a stretching direction during the stretching is controlled to be from 10 MPa to 60 MPa.

2. A method for producing an optical film comprising a first domain of a cellulose acylate polymer composition and a second domain disposed inside the first domain, wherein the second domain is a bubble having a morphology anisotropy, and the mean alignment direction of the main chain of the polymer molecule in the first domain differs from the mean direction of the major axis of the second domain, the method comprising:

stretching a film comprising a cellulose acylate polymer composition and having a haze of at most 1% at a stretching temperature of from (Tg−20)° C. to Tc° C. and at a draw ratio of from 30 to 150% wherein Tg means the glass transition temperature (unit, ° C.) of the film and Tc means the crystallization temperature (unit, ° C.) of the film, wherein a temperature difference between a surface temperature and a back temperature of the film during the stretching is controlled to be at least 0.1 degrees.

3. A method for producing an optical film comprising a first domain of a cellulose acylate polymer composition and a second domain disposed inside the first domain, wherein the second domain is a bubble having a morphology anisotropy, and the mean alignment direction of the main chain of the polymer molecule in the first domain differs from the mean direction of the major axis of the second domain, the method comprising:

stretching a film comprising a cellulose acylate polymer composition and having a haze of at most 1% at a stretching temperature of from $(Tg-20)°$ C. to $Tc°$ C. and at a draw ratio of from 30 to 150% wherein Tg means the glass transition temperature (unit, $°$ C.) of the film and Tc means the crystallization temperature (unit, $°$ C.) of the film, wherein the bubble of the second domain is filled with air.

* * * * *